No. 830,514. PATENTED SEPT. 11, 1906.
R. W. MANSFIELD.
EDUCATIONAL GAME APPARATUS.
APPLICATION FILED DEC. 31, 1904.

Witnesses
L. C. Allyn
E. M. Blair

Inventor
Richard W. Mansfield,
By his Attorney
Rob S. Allyn.

UNITED STATES PATENT OFFICE.

RICHARD W. MANSFIELD, OF NEW LONDON, CONNECTICUT.

EDUCATIONAL GAME APPARATUS.

No. 830,514.         Specification of Letters Patent.         Patented Sept. 11, 1906.

Application filed December 31, 1904. Serial No. 239,096.

*To all whom it may concern:*

Be it known that I, RICHARD W. MANSFIELD, a citizen of the United States, residing at New London, county of New London, State of Connecticut, have invented certain new and useful Improvements in Educational Game Apparatus, of which the following is a full, clear, and exact description.

My invention relates to educational game apparatus, and particularly to the class covered by my Patent No. 779,229, dated January 3, 1905.

The object of this invention is to provide a board with "letters" and men adapted to other games and variations of play combining the elements of chance and skill.

The details of the preferred form of apparatus are illustrated in the accompanying sheet of drawings and described briefly in the following specification.

Figure 1:
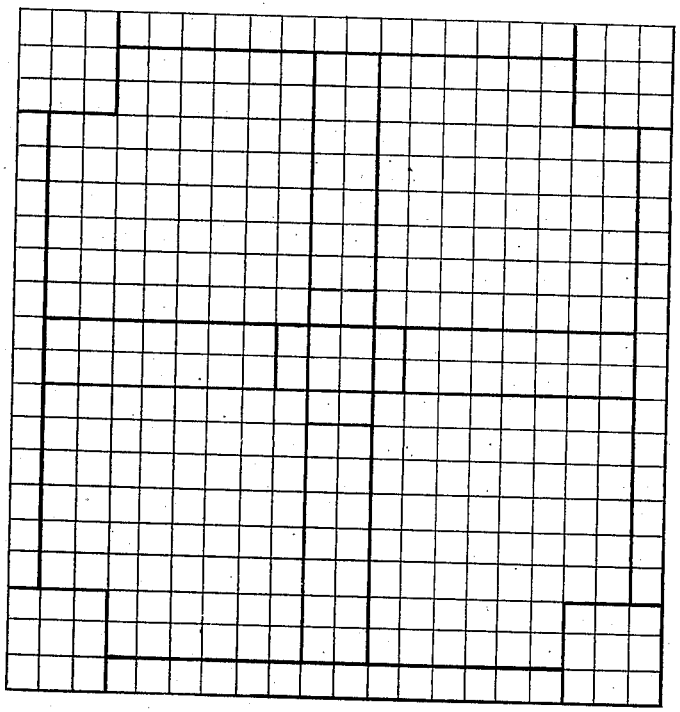
Figure 2:
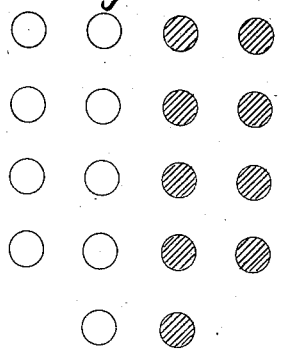
Figure 3:
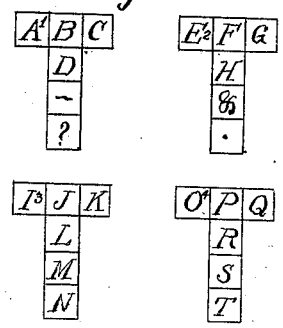
Figure 4:
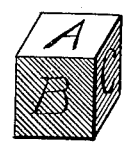
Figure 5:
Figure 5:
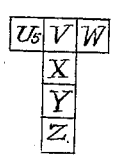

Figure 1 shows the board with the preferred markings of paths and places for some of my new games. Fig. 2 shows a set of men for moving on the paths. Fig. 3 shows the development of the surfaces of a set of cubical pieces bearing letters. Fig. 4 is a perspective view of one form of lettered "piece." Fig. 5 is a similar view of another form.

The board is preferably square and has its surface divided into small squares or spaces. Double "paths," outlined or colored, cross the center of the board. The surface between the cross-paths contain, preferably, $9 \times 9 = 81$ squares and each corner an outlined or colored "place" containing $3 \times 3 = 9$ squares. Paths also connect the places along the sides of the board. A central inclosure contains $2 \times 2 = 4$ squares. Two squares in each cross-path adjacent the center are also outlined or colored, making a cross of $6 \times 2 = 4 \times 3 = 12$ squares. The outlines and coloring and number of spaces may be varied or certain ones omitted if it is only desired to play particular games.

The pieces bear letters, and several are provided bearing each letter, as in my former patent—for instance, sixteen of each vowel and eight of each consonant or different numbers of each, depending on the frequency of common use in spelling. This form may be used for certain games. Preferably, however, I employ pieces bearing letters on each of more than one face, each face having its own color of letter or background to distinguish the pieces of each player in certain games. All the pieces bear the same combination of colors or backgrounds, and each letter appears several times in each color. Thus if the pieces have six faces, each face will have a different letter and a different color, and there will be several pieces with the same arrangement of letters—say thirty—of which five will have the letters in one series of colors, five in a second series of the same colors, and so on, making for the plurality of sets $5 \times 6 \times 5 = 150$ for the alphabet.

Fig. 3 shows the development of the surfaces of a set of five cubical pieces with a complete alphabet, each piece bearing a vowel and the next consecutive consonants, ("W" and "Y" being regarded as consonants.) Such a set enables the players to more readily select letters. It also reduces the necessary number of pieces for a game, since each piece represents a plurality of letters, and consequently a large number of chances. The pieces are played on the spaces of the board. Some letters are assigned definite values, as "A" equals one, "E" equals two, "I" equals three, "O" equals four, "U" equals five, "X" equals "out," "Y" equals "miss," "Z" equals "return," &c., for certain games. One or more counters or men are provided for each player for certain games for moving on the paths from place to place, in accordance with the "values" of the letters drawn or words spelled. These men are distinguished from each other for each player by color, form, or otherwise, but preferably bear Indian heads or names.

Games similar to those of my former patent may be played with this apparatus and many others, including the following:

*Indian trail.*—Each player has two men and draws letters enough to fill his corner-place or wigwam and moves his men, counting along the side path and across the center, as many spaces as determined by the total value of vowels drawn. The one having the smallest total then starts and tries to spell a word or words from the letters in his wigwam, placing them as spelled on the spaces adjacent his wigwam and between the paths and moving his men one space for each word spelled. He then draws two more letters and continues to play as long as he can spell a word. The opponent then plays after the same manner, each endeavoring to get his men across the board and into his opponent's wigwam. Men cannot pass on the single side path and can capture when in the center inclosure and send the opponent back to his wigwam. On the spaces next the center a man can repulse or drive back his opponent five spaces. This game can be played by partners, each pair taking the adjacent wigwams. Players may move off the cross-paths into the fields to avoid possible attack or to capture a letter of the opponent, but must move back as soon as one man has passed.

*Letter-ball.*—Each player has a team of nine men, pitcher, and catcher, &c., and draws a letter from the box or pile. The one having a letter nearest "A" begins and his side is at bat. He draws a letter and places a man in his place at bat and moves his man to the base of the first cross-path at the right, (first base,) then to the center, (second base,) then to the foot of the cross-path at the left, (third base,) and so home, according to the letters drawn. "A" entitles the batter to a base hit, "E" equals two-base hit, "I" equals three-base hit, "O" equals out, "U" equals home run; "B," "C," "D," "F," "G," "H," "J," and "K" equal strikes; "L," "M," "N," "P," "Q," "R," "S," and "T" equal balls; "V," "W," "X," "Y," "Z" equal fouls. A word spelled gives a home run. Three strikes put a man out, and four balls entitle him to first base. Three outs retire the side. The score can be kept by a counter.

*Indian traveler.*—Each player has one man and fills his "field" between the paths and places with letters. At a signal each player starts to spell the names of cities and removes the letters from the field. His corner is "home;" the other corners different countries, toward and through which his man is moved along the side paths, according to the names spelled and the values of the vowels they contain. If no one reaches home by using one field of letters, then each player draws a new fieldful and continues on a new signal to play. Men cannot pass on the side paths, but only in the places and at the base of the cross-paths.

*Turn-spell,* (*for two players, using lettered pieces with two colored faces.*)—Each player draws two lettered pieces and places them with his own color up in the spaces diagonally opposite each other in the center inclosure, (disregarding the paths.) The players then each alternately draw a piece and place it with their own color up in a space next a piece with the opponent's color up, but opposite and in line with a piece with their own color up, and immediately turn over the intervening pieces, so as to make a continuous line of pieces all of their own color up. This is kept up until one player in turning finds a word spelled in his own color of three, four, or five letters, as may be decided on, and in any direction forward or backward, up or down, thus winning.

Four players may each draw three lettered pieces having four colored faces and place them one with each color up in the spaces of the center inclosure and the other two symmetrically in the adjacent spaces of the cross and then begin and continue playing as for two, turning all intervening pieces their own color up until one spells a word.

*Block-spell,* (*for two, three, four, five, or six.*)—Each player in turn draws a lettered cube at random from a pile or box and places it with his own color up on a space of the board, endeavoring to spell a four-letter word in a straight line in his own color or a six-letter word in any combination of colors which may be face up in a line on the board. One player may thus block off another from a straight four-letter word, but thus make it possible for him later to spell a six-letter combination-word. Player is entitled to one point for each word spelled and points in addition according to the value of the vowel of his own color in the word spelled. Thus "D-E-N" $=1+3=4$ points. Each player moves his man one space in his own corner for each point made. Ten points, taking a man out of the corner inclosure, wins.

Of course for each of these games above described only such paths and inclosures are necessary as are used in the game. The others may be disregarded or omitted, so far as the particular game is concerned. All of the games may be played on the same board, however, as the outlines are simple. So, also, different games require different numbers of men. Plain lettered checkers, such as described in my former patent, are preferable in certain games, while in others they must have two or more faces or be of different colors, substantially as described.

What I claim is—

1. In a game apparatus, the combination of a board having outlined "places" and "paths" connecting the "places," a set of lettered pieces for spelling words, some of said pieces having assigned moving values in addition to their spelling values and men for moving on the "paths" as determined by the values of the letters drawn and the words spelled.

2. In a game apparatus, the combination of a board having "places" in the corners and "paths" connecting the "places," a set of lettered pieces some of which have assigned moving "values" in addition to their spelling values and men for moving from "place" to "place" along the "paths" as determined by the letters drawn and words spelled.

3. In a game apparatus, the combination of a board having its surface divided into a large number of small spaces of uniform size with a central inclosure containing four spaces and a set of pieces having letters on two faces in distinguishing-colors and including a plurality of pieces with each letter in each color, for playing and turning on the board.

4. In a game apparatus, the combination of a board having its surface divided into a large number of small uniform spaces with an inclosure containing a limited number of spaces and a set of cubiform pieces having letters on the different faces in distinguishing-colors and including a plurality of pieces with each letter in each color.

5. In a game apparatus, the combination of a board having its surface divided into uniform spaces with double "paths" running across the center from side to side, "places" in the corners and outlined connecting-paths between the "places" and the double central paths.

6. In a game apparatus the combination of a board having a series of "places" and "paths" connecting the "places," with a plurality of pieces, each bearing letters on a plurality of faces and men for moving from "place" to "place" along the "paths."

7. In a game apparatus, a board having a central area, four paths adjacent the central area, each path being divided into a double row of spaces, four corner-places, paths connecting said places and said double paths, and fields between said paths.

8. In a game apparatus, a board having "places" in the corners, double distinguishing "paths" leading from the centers of the edges to the center of the board, "fields" between the "places" and the double "paths" divided into spaces of uniform size, and single distinguishing "paths" leading from the "places" toward the double "paths."

9. In a game apparatus, the combination with a board having places, paths connecting the places, and fields between the paths, of a set of cubical pieces each bearing letters on its different faces, and a plurality of men for moving along the paths from place to place.

Signed at New London, Connecticut, this 29th day of December, 1904.

RICHARD W. MANSFIELD.

Witnesses:
SIDNEY H. MINER,
FRANK HOWARD.